Nov. 13, 1962     AKE MALMGREN     3,063,511
TRANSPORTATION VEHICLE
Filed May 11, 1960     2 Sheets—Sheet 1
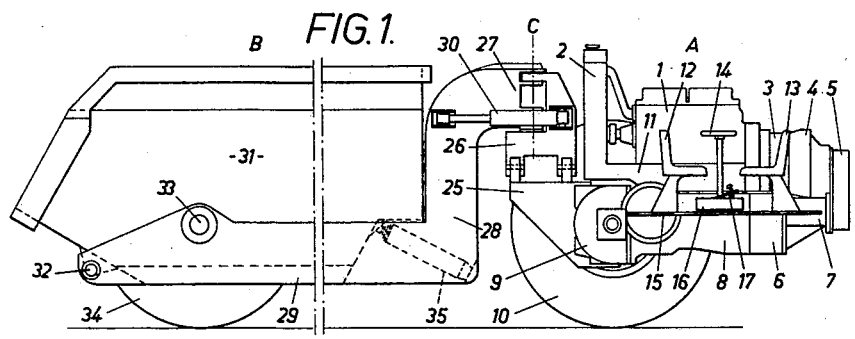
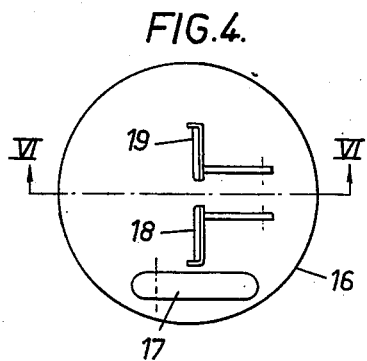
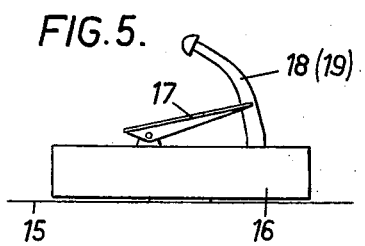
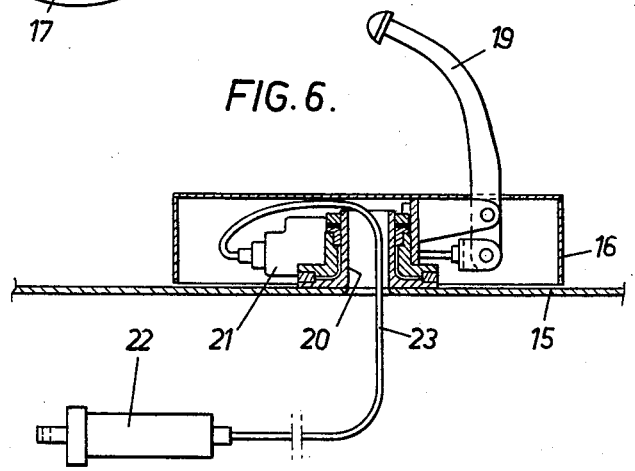
Inventor
Ake Malmgren
by Sommers & Young
Attorneys

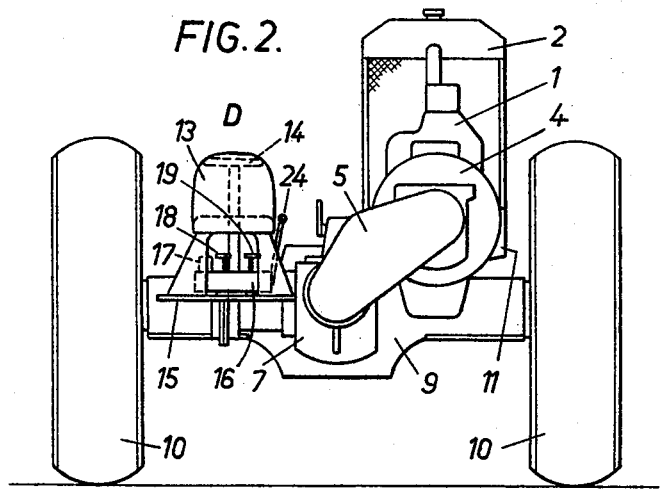
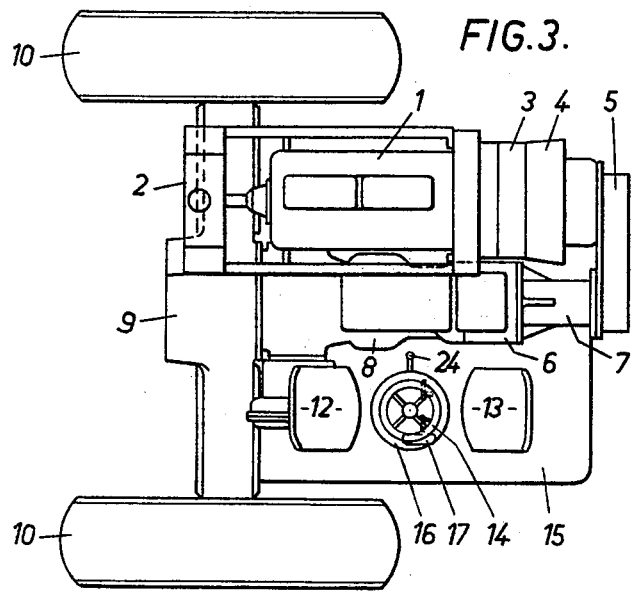

United States Patent Office 3,063,511
Patented Nov. 13, 1962

3,063,511
TRANSPORTATION VEHICLE
Åke Malmgren, Tvargalan 5, Kiruna, Sweden
Filed May 11, 1960, Ser. No. 28,406
Claims priority, application Sweden May 22, 1959
5 Claims. (Cl. 180—12)

For the transportation of weighty goods and more particularly for the transportation of ore in mine areas where the freedom of movement in respect of vehicles of transportation is highly restricted, both laterally and vertically, it is known to use special motor lorries or trucks which combine a large carrying capacity with a small extent, above all in the longitudinal direction. Such vehicles comprise the combination of a short two-wheel power vehicle and a likewise two-wheel trailer of large carrying capacity articulated with the power vehicle about a vertical pivot axis, allowing the steering to be effected by a pivotal rotation between the power vehicle and the trailer.

Owing to the fact that the dimensions of the trailer are determined by the carrying capacity desired the length of the power vehicle will be of great importance in determining the total length of the combined vehicle. For certain purposes, as for driving the vehicles through drifts and tunnels of mines, the problem of obtaining at the same time a maximum of carrying capacity and a minimum of length of the combined vehicle is solved by the use of an electrically driven power vehicle the electrical motor of which is fed by means of a cable. The cost of manufacture of such a vehicle will be exceedingly high and owing to the trailing cable the vehicle can only move within a very restricted range.

The present invention has for its object to provide a transportation vehicle of the type comprising the combination of a short two-wheel power vehicle and a likewise two wheel trailer articulated with the power vehicle about a vertical pivot axis, where the power vehicle may be built at exceedingly low costs as compared with those of hitherto used specially constructed vehicles, while retaining an unlimited freedom of movement and allowing the space for the load to be utilized to a maximum.

Another object is to provide a vehicle of the type stated having a tilting body which may be tilted in a space of very limited vertical height.

A further object is to provide a vehicle of the type stated which may be steered equally safely in driving backwards or forwards, and in which the driver's seat does not require any increase of the length of the vehicle.

A principal feature of the invention resides in that the power system of the power vehicle comprises two halves situated side by side, one half comprising the engine with its radiator and clutches being so mounted as to face the radiator towards the trailer and positioned on such a level as to allow the radiator to project rearwardly over the cap of the driving wheel axles, and the other half comprising the differential gear connected to the driving wheel axles and associated gearings being situated on a lower level corresponding to that of the cap of the driving wheel axles, a transmission gear being inserted between the two halves at the front ends thereof for the transmission of power therebetween.

Another feature of the invention involves the provision of two oppositely positioned driver's seats on the said lower half part of the power unit located on opposite sides of a steering wheel and a set of pedals rotatable about a vertical axis so that it may be brought into position for being controlled from any of the driver's seats. The power vehicle may be obtained according to the invention by rebuilding a standard type of tractor having two larger driving wheels and two smaller steering wheels. To this end the steering wheels and associated steering elements are removed whereupon the remainder of the tractor is divided at a suitable point substantially midway between its ends so that two substantially equally long halves result. The half including the engine is then turned horizontally by 180 degrees and placed by the side of the half including the driving wheels with the radiator thus facing rearwardly. The cut ends of the halves are then connected by means of suitable transmission gear.

By rebuilding a standard type of tractor in this way a two-wheel power vehicle fit for connection with a two-wheel trailer is obtained the length of which is substantially equal to half that of the original tractor, thereby considerably reducing the total length of the combined power vehicle and trailer and reducing the costs of manufacture of the combined vehicle accordingly.

In the drawings, a preferred embodiment of the invention is shown in a substantially diagrammatic manner.

FIG. 1 is a side elevation of the combined vehicle. FIG. 2 is a front view of the power vehicle. FIG. 3 is a top plan view of the power vehicle. FIG. 4 is a top plan view of a rotatable pedal housing. FIG. 5 is a side elevation of said housing. FIG. 6 is a vertical section taken along the line VI—VI of FIG. 4 on a larger scale.

With reference to FIG. 1 of the drawing, the reference character A indicates the power vehicle as a whole, B is the trailer and C is the pivot axis between the power vehicle and the trailer.

The power vehicle A, see also FIGS. 2 and 3, is constructed in the way above outlined, that is to say, by removing the steering wheels and the associated steering elements of a standard type of tractor and dividing the remainder of the tractor in the middle of its length.

In FIGS. 1 to 3, the numeral 1 indicates the engine, 2 is the associated radiator, 3 is the housing of a hydraulic clutch mounted on the power shaft and 4 is a laminated clutch. The division of the power system of the tractor freed from its steering wheels into two substantially equally long parts is made by cutting through the shaft outgoing from the laminated clutch.

The half part including the engine is then turned horizontally through 180 degrees and placed by the side of the other half of the power system connected to the driving wheels. Thus, the radiator is facing rearwardly, as shown.

The ends of the shaft of the laminated clutch which are now both pointing forwardly are connected by means of a suitable transmission gear the casing of which is shown at 5.

The half-part of the power system extending between the transmission gear 5 and the driving wheel axles may include, for instance, a reversing gear box 6 with an extension 7 for length accommodation, and a differential gear box 8 connected to the cap 9 of the driving wheel axles. The driving wheels are shown at 10.

The half-part of the power system including the engine is supported by a base member 11, in its turn supported by the wheel axles on such a level that its rear end portion supporting the radiator may extend rearwardly over the axle cap 9, as shown in FIG. 1, thereby essentially contributing to the reduction of the total length of the power vehicle.

The other half-part of the power system connected to the axle cap 9 is positioned on a level corresponding to the level of the driving wheel axles, that is to say, on a substantially lower level than the engine base 11. Because of this relative vertical positioning of the two halves of the power system there will be ample space beside the engine for mounting the driver's seat without requiring any increase of the length of the power vehicle.

In said space there are provided according to the invention two oppositely positioned driver's seats 12 and 13, one rearwardly and another forwardly of a common steering wheel, only diagrammatically indicated at 14. Said seats 12 and 13 are mounted on a floor 15 provided on a suitable level in the space D available between the engine and the driving wheel remote therefrom. Mounted on said floor 15 between the two seats 12 and 13 is a pedal housing 16 supporting a set of pedals including a gas pedal 17, a brake pedal 18 and a clutch pedal 19, as is more clearly shown in FIGS. 4 to 6.

In order that said pedals may be common to both driver's seats, the housing 16 with the pedals are mounted to rotate through an angle of at least 180° about a vertical axis.

In FIG. 6 the housing 16 is shown as comprising an open-bottomed cylinder closed at its top which is mounted to rotate on a tubular pivot 20 fastened to the floor 15. Projecting through holes in the top wall of the housing 16 are the three pedals. Within the housing each pedal controls an individual one of three main cylinders 21 one of which only is shown in FIG. 6. Each main cylinder 21 is connected to a working cylinder 22 external of the housing via a flexible tube 23, leading out through the tubular pivot, as shown.

In FIG. 1 the pedal housing 16 is set for allowing operation of the pedals by the driver when sitting on seat 12. After rotation of the housing 16 through 180° from the position shown in FIG. 1 the pedals may be operated by the driver when sitting on seat 13. Means may be provided for locking the housing in desired position. In FIGS. 2 and 3 a locking lever is indicated at 24.

Thanks to the provision of double seats for the driver, the driver is allowed to steer the vehicle equally safely in backward drive as in forward drive.

Rigidly connected to the cap 9 of the driving axles is a bracket 25 for supporting a bearing 26 for the vertical pivot pin by means of which the trailer is articulated with the power vehicle. Said pivot pin as hereinbefore stated is not shown but indicated by its axis C. The bearing of the trailer for said pivot pin is indicated at 27. In the example shown it is formed integrally with a goose-neck member 28 of the trailer frame 29.

Steering motion between the power vehicle A and the trailer B is obtained by means of a pair of hydraulic cylinders one of which is shown at 30 in FIG. 1.

The relative arrangement and dimensioning of the articulation means are chosen with a view to allowing steering of the power vehicle a complete 90° turn in either direction from normal.

Supported by the frame 29 of the trailer is a body 31 mounted to tilt about a hinge pin 32 located at the rear end of the frame 29 on a level considerably below that of the axle 33 of the trailer wheels 34. By this means the free height required for allowing tilting of the body 31 may be reduced to a minimum. This is of great importance in driving in low mine tunnels. The said low mounting of the tilting axis 32 at the rear end of the trailer frame also allows the body to be built for a large loading capacity with given external dimensions as compared with bodies of conventional trailers the tilting axis of which is located at a higher level and at a more advanced point of the trailer frame.

The tilting movement may be controlled by means of hydraulic cylinders one of which is indicated at 35.

The means for controlling said cylinders are not shown, nor are the means for controlling the steering cylinders 30, since said means may be of conventional structure.

I claim:

1. In a combined power vehicle and trailer structure for heavy loads the combination of a power vehicle having two drive axles, and two wheels mounted on said axles at the sides of said vehicle respectively, a two-wheeled trailer, a pivotal connection including a vertical pivotal axis between said power vehicle and trailer, steering means connecting the power vehicle and the trailer for allowing them to swing with relation to each other about said vertical axis, a power generating and transmitting system on the power vehicle comprising two half-parts situated beside each other, one half part, including an engine having a radiator and associated coupling members positioned near one of said wheels of the power vehicle so as to leave a wide free space between its side remote from said adjacent wheel and the other wheel of the power vehicle, the other half-part including reversing and differential mechanism for connection with the wheel axles being situated alongside the first-mentioned half part of said system on a lower level with relation thereto, a power transmission mechanism for connecting together the two halves of the power system at the front end of the power vehicle, a cap enclosing the wheel axles of the power vehicle, a frame member rigidly connected to said cap for supporting the half-part of the power system including said engine adjacent one wheel of the power vehicle on a level above said cap, another frame member rigidly connected to said cap for affording a platform for a driver in the space between said engine and the wheel remote therefrom.

2. In a vehicle as claimed in claim 1, the provision on the platform in the space between the engine and the wheel remote therefrom, of a control mechanism including a hand-wheel, having a vertical axis, a pedal set rotatable around the axis of the hand-wheel, and two stationary seats for the driver positioned forwardly and rearwardly, respectively, of said hand-wheel, and two stationary seats for the driver positioned forwardly and rearwardly, respectively, of said hand-wheel and pedal set.

3. In a combined power vehicle and trailer structure as claimed in claim 1, in which the platform provided in the space between the engine and the power vehicle wheel remote therefrom is situated on a lower level than the frame member supporting the engine and associated elements of the first half-part of power system.

4. In a combined power vehicle and trailer structure as claimed in claim 1 and in which the wheel axle cap of the power vehicle supports a bracket projecting rearwardly therefrom for supporting a bearing for the pivot between the power vehicle and the trailer as well as the steering means connecting them, the further feature that the frame member supporting the engine and associated elements of the first half-part of the power system adjacent one of the power vehicle wheels is extended rearwardly over said cap and supports the radiator of the engine by its thus extended end portion aft of the wheel axles of the power vehicle.

5. In a combined power vehicle and trailer structure for heavy loads the combination of a power vehicle having two drive axles and two wheels mounted thereon at the sides of the power vehicle respectively, a two-wheeled trailer, a pivotal connection including a vertical axis between said power vehicle and trailer, steering means connecting the power vehicle and the trailer for allowing them to swing with relation to each other about said vertical axis, a power generating and transmission system on the power vehicle comprising two-half-parts, one half-part including an engine having a radiator and coupling members, the other half-part including reversing and differential mechanisms for connection with the axle system of said power vehicle wheels, said other half-part being connected to said axle system at a point midway between the wheels of the power vehicle and extending forwardly thereof on a level with the axle system, the first-mentioned half-part of the power and power-transmission system extending parallel with said other half-part on a higher level in the space between a longitudinal vertical plane through the axis of the other half-part of the power system and one wheel of the power vehicle so as to leave a free space between its side remote from said wheel and the other wheel of the power vehicle, a cap enclosing said axles of the power generating and transmission vehicle, a bracket supported by said cap on its side facing the trailer for supporting a bearing unit for the vertical axis between the power vehicle and the trailer and the associated steering means, a frame member projecting forwardly from said cap for supporting the engine and associated elements forming one half-part of said power generating and transmission system, another frame member projecting forwardly from said cap so as to form a platform in said space on a lower level than the first-mentioned frame member, control members including a handwheel and a set of pedals on said platform, and two driver seats positioned forwardly and rearwardly of said control members.

References Cited in the file of this patent

UNITED STATES PATENTS

| | | |
|---|---|---|
| 732,283 | Ewer | June 30, 1903 |
| 1,748,926 | French | Feb. 25, 1930 |
| 2,349,196 | Perkins | May 16, 1944 |
| 2,384,890 | Coldwell | Sept. 18, 1945 |
| 2,437,626 | Tinsley | Mar. 9, 1948 |
| 2,747,886 | Lee | May 29, 1956 |
| 2,913,061 | Beyerstedt | Nov. 17, 1959 |
| 2,940,533 | McAdams | June 14, 1960 |